United States Patent
Wevers et al.

(10) Patent No.: US 7,947,379 B2
(45) Date of Patent: *May 24, 2011

(54) COMPOSITIONS AND AQUEOUS DISPERSIONS

(75) Inventors: Ronald Wevers, Terneuzen (NL); James G. Kennedy, Briston (GB); Aaron M. Bujnowski, Frisco, TX (US); Brad M. Moncla, Lake Jackson, TX (US); Wenbin Liang, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/858,082

(22) Filed: Aug. 17, 2010

(65) Prior Publication Data

US 2010/0310858 A1    Dec. 9, 2010

Related U.S. Application Data

(63) Continuation of application No. 12/620,684, filed on Nov. 18, 2009, now Pat. No. 7,799,864, which is a continuation of application No. 12/097,389, filed as application No. PCT/US2006/046517 on Dec. 4, 2006, now Pat. No. 7,645,521, and a continuation-in-part of application No. 11/300,807, filed on Dec. 15, 2005.

(51) Int. Cl.
*B32B 27/32* (2006.01)
*B01F 17/00* (2006.01)

(52) U.S. Cl. ........ 428/523; 524/515; 524/522; 524/528; 524/915

(58) Field of Classification Search .................. 428/523; 524/515, 522, 528, 915
See application file for complete search history.

(56) References Cited

U.S. PATENT DOCUMENTS 4,243,568 A * 1/1981 Brown ........................... 524/562
7,645,521 B2 * 1/2010 Wevers et al. ................ 428/523

FOREIGN PATENT DOCUMENTS

WO    WO 99/24492    *    5/1999

* cited by examiner

*Primary Examiner* — Fred M Teskin

(57) ABSTRACT

An aqueous dispersion including (A) at least one base polymer selected from the group consisting of an ethylene-based co-polymer and a propylene-based co-polymer; (B) at least one polymeric stabilizing agent; and at least one filler; wherein the polymeric stabilizing agent is different from the at least one base polymer and is compatible with the at least one base polymer and the at least one filler, and wherein the dispersion has filler in the range of greater than 0 to about 600 parts per hundred parts of a combined amount of the at least one base polymer and the polymeric stabilizing agent is disclosed.

11 Claims, 2 Drawing Sheets

COMPOSITIONS AND AQUEOUS DISPERSIONS

CROSS-REFERENCE TO RELATED APPLICATIONS

This application is a continuation application of U.S. patent application Ser. No. 12/620,684, filed on Nov. 18, 2009, now U.S. Pat. No. 7,799,864, entitled "COMPOSITIONS AND AQUEOUS DISPERSIONS," which is a continuation of U.S. patent application Ser. No. 12/097,389, filed on Jun. 13, 2008, now U.S. Pat. No. 7,645,521, which is a 371 National Phase of International Patent Application No. PCT/US2006/046517, filed on Dec. 4, 2006, the teachings of which are incorporated by reference herein as if reproduced hereinbelow, and a Continuation-in-Part application of U.S. patent application Ser. No. 11/300,807, filed on Dec. 15, 2005, entitled, "COMPOSITIONS AND AQUEOUS DISPERSIONS," the teachings of which are incorporated by reference herein, as if reproduced in full hereinbelow.

BACKGROUND OF INVENTION

1. Field of the Invention

The present invention relates generally to aqueous dispersions that include a filler. More specifically, the present invention relates to dispersions that are useful in the carpet industry.

2. Background Art

Methods and techniques for carpet construction are known in the art. A variety of types of carpets exist, including tufted and non-tufted carpets. Tufted carpets are composite structures that include yarn (known as a fiber bundle), a primary backing material having a face surface and a back surface, an adhesive backing material and, optionally, a secondary backing material.

Typically, in order to form the face surface of a tufted carpet, yarn is tufted through the primary backing material such that the longer length of each stitch extends through the face surface of the primary backing material. Typically, the primary backing material is made of a woven or non-woven material such as a thermoplastic polymer, most commonly polypropylene.

The face of a tufted carpet is generally manufactured using one of three methods. First, for a loop pile carpet, the yarn loops formed in the tufting process are left intact. Second, for a cut pile carpet, the yarn loops are cut, either during tufting or after, to produce a pile of yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the backside of the primary backing material typically comprises tight, unextended loops.

The combination of tufted yarn and a primary backing material without the application of an adhesive backing material or a secondary backing material is referred to in the carpet industry as raw tufted carpet or greige goods. Greige goods become finished tufted carpet with the application of an adhesive backing material and an optional secondary backing material to the backside of the primary backing material. Finished tufted carpet can be prepared as broad-loomed carpet in rolls typically 6 or 12 feet (~2 or ~4 meters) wide. Alternatively, carpet can be prepared as carpet tiles, typically 18 inches (50 cm) square to 4 ft (1.3 m) square.

The adhesive backing material is typically applied to the backface of the primary backing material to affix the yarn to the primary backing material. In one method, the adhesive backing material is applied by a pan applicator using a roller, a roll over a roller or a bed, or a knife (also known as a doctor blade) over a roller or a bed. When applied properly, the adhesive backing material does not pass through the primary backing material.

The adhesive backing material may be applied as a single coating or layer or as a multiple layer. The extent or tenacity to which the yarn is affixed is referred to as "tuft lock" or tuft bind strength. Carpets with sufficient tuft lock exhibit good wear resistance and, as such, have longer service lives. In order to have good performance characteristics, the adhesive backing material should substantially penetrate the yarn (fiber bundle) exposed on the backside of the primary backing material and should substantially consolidate individual fibers within the yarn. Good penetration of the yarn and consolidation of the fibers leads to good abrasion resistance. Moreover, in addition to good tuft bind strength and abrasion resistance, the adhesive material preferably imparts or allows good flexibility to the carpet in order to facilitate installation of the carpet.

The secondary backing material is typically a lightweight scrim made of woven or non-woven material such as a thermoplastic polymer, most commonly polypropylene. The secondary backing material is optionally applied to the backside of the carpet onto the adhesive backing material, primarily to provide enhanced dimensional stability to the carpet structure as well as to provide more surface area for the application of direct glue-down adhesives.

Alternative backing materials may include foam cushioning (e.g. foamed polyurethane) and pressure sensitive floor adhesives. Alternative backing materials may also be applied, for example, as webbing with enhanced surface area, to facilitate direct glue-down adhesive installations (e.g., in contract commercial carpeting, automobile carpet and airplane carpet where the need for cushioning is ofttimes minimal). Alternative backing materials can also be optionally applied to enhance barrier protection with respect to moisture, insects, and foodstuffs, as well as to provide or enhance fire suppression, thermal insulation, and sound dampening properties of the carpet.

Known adhesive backing materials include curable latex, urethane or vinyl systems, with latex systems being most common. Conventional latex systems are low viscosity, aqueous compositions that can be applied at high carpet production rates and offer good fiber-to-backing adhesion, tuft bind strength and adequate flexibility. Generally, excess water is driven off and the latex is cured by passing through a drying oven. Styrene butadiene rubbers (SBR) are the most common polymers used for latex adhesive backing materials. Typically, the latex backing system is heavily filled with an inorganic filler such as calcium carbonate or aluminum trihydrate and includes other ingredients such as antioxidants, antimicrobials, flame retardants, smoke suppressants, wetting agents, and froth aids.

Conventional latex adhesive backing systems can have certain drawbacks. As one important drawback, typical latex adhesive backing systems do not provide a moisture barrier. Another possible drawback, particularly with a carpet having polypropylene yarn and polypropylene primary and secondary backing materials, is the dissimilar polymer of latex systems along with the inorganic filler can reduce the recyclability of the carpet. Additionally, the high molecular weights of latex systems can significantly reduce the recyclability.

In view of these drawbacks, some in the carpet industry have begun seeking suitable replacements for conventional latex adhesive backing systems. One alternative is the use of urethane adhesive backing systems. In addition to providing adequate adhesion to consolidate the carpet, urethane backings generally exhibit good flexibility and barrier properties and, when foamed, can eliminate the need for separate underlayment padding (i.e., can constitute a direct glue-down unitary backing system). However, urethane backing systems also have important drawbacks, including their relatively high cost and demanding curing requirements which necessitate application at slow carpet production rates relative to latex systems.

Thermoplastic polyolefins such as ethylene vinyl acetate (EVA) copolymers and low density polyethylene (LDPE) have also been suggested as adhesive backing materials due in part to their low costs, good moisture stability and no-cure requirements. Various methods are available for applying polyolefin backing materials, including powder coating, hot melt application, and extruded film or sheet lamination. However, using polyolefins to replace latex adhesive backings can also present difficulties. For example, U.S. Pat. No. 5,240,530, Table A at Col. 10, indicates that ordinary polyolefin resins possess inadequate adhesion for use in carpet construction. Additionally, relative to latex and other cured systems, ordinary polyolefins have relatively high application viscosities and relatively high thermal requirements. That is, ordinary thermoplastic polyolefins are characterized by relatively high melt viscosities and high recrystallization or solidification temperatures relative to the typical aqueous viscosities and cure temperature requirements characteristic of latex and other cured (thermosetting) systems.

Even ordinary elastomeric polyolefins, i.e. polyolefins having low crystallinities, generally have relatively high viscosities and relatively high recrystallization temperatures. High recrystallization temperatures result in relatively short molten times during processing and, when combined with high melt viscosities, can make it difficult to achieve adequate penetration of the yarn, especially at conventional adhesive backing application rates.

One method for overcoming the viscosity and recrystallization deficiencies of ordinary polyolefins is to formulate the polyolefin resin as a hot melt adhesive. Such a method usually involves formulating low molecular weight polyolefins with waxes, tackifiers, various flow modifiers and/or other elastomeric materials. Ethylene/vinyl acetate (EVA) copolymers, for example, having been used in formulated hot melt adhesive backing compositions and other polyolefins compositions have also been proposed for use in hot melt backing compositions. For example, in U.S. Pat. No. 3,982,051, Taft et al. disclose that a composition comprising an ethylene/vinyl acetate copolymer, atactic polypropylene, and vulcanized rubber is useful as a hot melt carpet backing adhesive.

Unfortunately, hot melt adhesive systems are not generally considered to be complete replacements for conventional latex adhesive backings. Typical hot melt systems of EVA and other copolymers of ethylene and unsaturated comonomers can require considerable effort in formulation and often yield inadequate tuft bind strengths. Furthermore, they require the purchase of new capital as they cannot be run on latex-enabled systems. However, the most significant deficiency of typical hot melt systems is their melt strengths, which are generally too low to permit application by a direct extrusion coating technique. As such, polyolefin hot melt systems are typically applied to primary backings by relatively slow, less efficient techniques, such as by the use of heated doctor blades or rotating melt transfer rollers.

While unformulated high pressure low density polyethylene (LDPE) can be applied by a conventional extrusion coating technique, LDPE resins typically have poor flexibility, which can result in excessive carpet stiffness. On the other hand, those polyolefins that have improved flexibility, such as ultra low density polyethylene (ULDPE) and ethylene/propylene interpolymers, still do not possess sufficient flexibility, have excessively low melt strengths, and/or tend to draw resonate during extrusion coating. To overcome extrusion coating difficulties, ordinary polyolefins with sufficient flexibility can be applied by lamination techniques to insure adequate yarn-to-backing adhesion; however, lamination techniques are typically expensive and can result in reduced production rates relative to direct extrusion coating techniques.

Known examples of flexible polyolefin backing materials are disclosed in U.S. Pat. Nos. 3,390,035; 3,583,936; 3,745,054; and 3,914,489. In general, these disclosures describe hot melt adhesive backing compositions based on an ethylene copolymer, such as ethylene/vinyl acetate (EVA), and waxes. Known techniques for enhancing the penetration of hot melt adhesive backing compositions in the yarn include applying pressure while the greige good is in contact with rotating melt transfer rollers as described, for example, in U.S. Pat. No. 3,551,231.

Another known technique for enhancing the effectiveness of hot melt systems involve using pre-coat systems. For example, U.S. Pat. Nos. 3,684,600; 3,583,936; and 3,745,054, describe the application of low viscosity aqueous pre-coats to the back surface of a primary backing material prior to the application of a hot melt adhesive composition. The hot melt adhesive backing systems disclosed in these patents are derived from multi-component formulations based on functional ethylene polymers such as, ethylene/ethyl acrylate (EEA) and ethylene/vinyl acetate (EVA) copolymers.

Another prior art method for manufacturing carpet is disclosed in PCT Publication No. 98/38376, which discloses an extrusion coating technique that uses a homogeneously branched linear ethylene polymer as a backing material. That application discloses using particle sizes in the 18 to 22 micron range and formulating a particle in water slurry.

Although there are various systems known in the art of carpet backings, there remains a need for a thermoplastic polyolefin carpet backing system, which provides adequate tuft bind strength, good abrasion resistance and good flexibility, to replace cured latex backing systems. A need also remains for an application method that permits high carpet production rates while achieving the desired characteristics of good tuft bind strength, abrasion resistance, barrier properties and flexibility. Finally, there is also a need for a carpet structure having fibers and backing materials that are easily recyclable without the necessity of extensive handing and segregation of carpet component materials.

SUMMARY OF INVENTION

In one aspect, the present invention relates to a compound including (A) at least one base polymer selected from the group consisting of an ethylene-based co-polymer and a propylene-based co-polymer; (B) at least one polymeric stabilizing agent; and at least one filler; wherein the polymeric stabilizing agent is different from the at least one base polymer and is compatible with the at least one base polymer and the at least one filler, and wherein the dispersion has filler in the range of greater than 0 to about 600 parts per hundred parts of a combined amount of the at least one base polymer and the polymeric stabilizing agent.

In one aspect, the present invention relates to a method of applying a compound to a substrate that includes forming an aqueous dispersion, the aqueous dispersion including (A) at least one base polymer selected from the group consisting of an ethylene-based co-polymer and a propylene-based co-polymer; (B) at least one polymeric stabilizing agent; and at least one filler; wherein the polymeric stabilizing agent is different from the at least one base polymer and is compatible with the at least one base polymer and the at least one filler, and wherein the dispersion has filler in the range of greater than 0 to about 600 parts per hundred parts of a combined amount of the at least one base polymer and the polymeric stabilizing agent; frothing the mixture with a gas; and applying the frothed mixture to a substrate.

Other aspects and advantages of the invention will be apparent from the following description and the appended claims.

DETAILED DESCRIPTION

Figure 1:
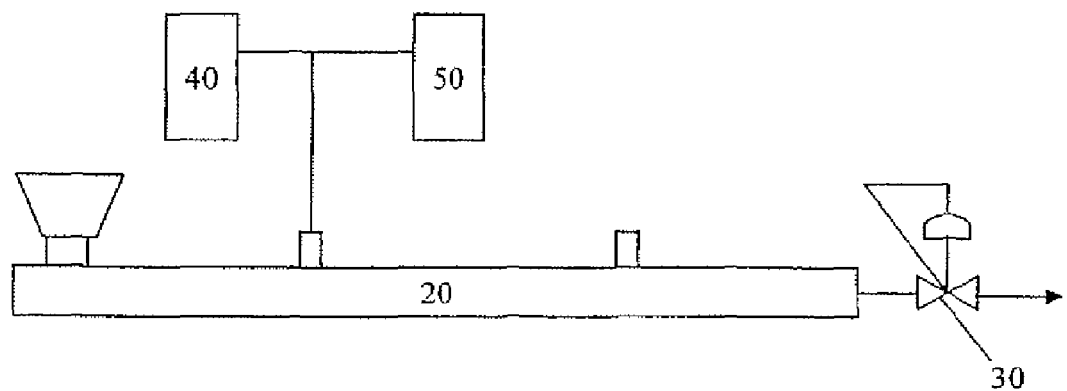
FIG. 1 shows an extruder that may be used in formulating dispersions in accordance with embodiments of the present invention.

Embodiments of the present invention relate to compositions that include a base polymer, a stabilizing agent, and a filler. The compositions thus formed are particularly useful in the carpet industry. With respect to the carpet industry, embodiments of the present invention are useful for needlepunch, weaved, and/or tufted carpets, including artificial turf. Further, specific terminology used in relation to the carpet industry is meant to be construed in accordance with the Dictionary of Fibers and Textile Technology, Product/Technical Communications Services IZ 503, Hoescht Celanese Corporation, Charlotte, N.C. 1990.

Briefly, as used herein, the term needlepunching refers to the process of converting batts or webs of loose fibers into a coherent non woven fabric on a needle loom. Weaving refers to the method or process of interlacing two yarns so that they cross each other to produce woven fabric. The warp yarns, or ends, run lengthwise in the fabric and the filling threads (weft) or picks, run from side to side. Finally, as used herein, tufting refers to the process of making carpet fabric by stitching a pile yarn through a primary backing cloth using needles to form rows of tufts.

Base Polymers

Embodiments of the present invention employ polyethylene-based polymers, polypropylene-based polymers, and propylene-ethylene copolymers as one component of a composition.

In selected embodiments, one component is formed from ethylene-alpha olefin copolymers or propylene-alpha olefin copolymers. In particular, in preferred embodiments, the base polymer comprises one or more non-polar polyolefins.

In specific embodiments, polyolefins such as polypropylene, polyethylene, and copolymers thereof, and blends thereof, as well as ethylene-propylene-diene terpolymers, may be used. In some embodiments, preferred olefinic polymers include homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. No. 6,538,070, 6,566,446, 5,869,575, 6,448,341, 5,677,383, 6,316,549, 6,111,023, or 5,844,045, each of which is incorporated herein by reference in its entirety, are also suitable in some embodiments. Of course, blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments single site catalysts may be used.

In some particular embodiments, the polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}C$ NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra.

In other particular embodiments, the base polymer may be ethylene vinyl acetate (EVA) based polymers.

In other selected embodiments, olefin block copolymers, e.g. ethylene multi-block copolymer, such as those described in the International Publication No. WO2005/090427 and U.S. patent application Ser. No. 11/376,835 may be used as the base polymer. Such olefin block copolymer may be an ethylene/α-olefin interpolymer:

(a) having a Mw/Mn from about 1.7 to about 3.5, at least one melting point, Tm, in degrees Celsius, and a density, d, in grams/cubic centimeter, wherein the numerical values of Tm and d corresponding to the relationship:

$$Tm > -2002.9 + 4538.5(d) - 2422.2(d)^2; \text{ or}$$

(b) having a Mw/Mn from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130J/g,}$$

$$\Delta T \geq 48° \text{ C. for } \Delta H \text{ greater than 130J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re>1481-1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G'(25° C.), and a storage modulus at 100° C., G'(100° C.), wherein the ratio of G'(25° C.) to G'(100° C.) being in the range of about 1:1 to about 9:1.

The ethylene/α-olefin interpolymer may also:

(a) having a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or (b) having an average block index greater than zero and up to about 1.0 and a molecular weight distribution, Mw/Mn, greater than about 1.3.

Those having ordinary skill in the art will recognize that the above list is a non-comprehensive listing of suitable polymers. It will be appreciated that the scope of the present invention is restricted by the claims only.

Stabilizing Agent

Embodiments of the present invention use a stabilizing agent. In selected embodiments, the stabilizing agent may be a surfactant, a polymer (different from the base polymer detailed above) having a polar group as either a comonomer or grafted monomer, or mixtures thereof. In preferred embodiments, the stabilizing agent comprises one or more polar polyolefins. Typical polymers include ethylene-acrylic acid (EAA) and ethylene-methacrylic acid copolymers, such as those available under the tradenames PRIMACOR™, Nucrel™, and Escor™ and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Those having ordinary skill in the art will recognize that a number of other useful polymers may also be used.

If the polar group of the polymer is acidic or basic in nature, the stabilizing polymer may be partially or fully neutralized with a neutralizing agent to form the corresponding salt. For example, for EAA, the neutralizing agent is a base, such as ammonium hydroxide or potassium hydroxide, for example. In another alternative, the neutralizing agent may, for example, be any amine such as monoethanolamine, or 2-amino-2-methyl-1-propanol (AMP). Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention can be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

Fillers

Embodiments of the present invention employ a filler as part of the composition. In the practice of the present invention, a suitable filler loading in a polyolefin dispersion can be from about 0 to about 600 parts of filler per hundred parts of polyolefin. The filler material can include conventional fillers such as milled glass, calcium carbonate, aluminum trihydrate, talc, bentonite, antimony trioxide, kaolin, fly ash, or other known fillers.

Formulations

In preferred formulations, therefore, compounds in accordance with the present invention may include a base polymer, which comprises one or more non-polar polyolefins, a stabilizing agent, which comprises one or more polar polyolefins, and a filler. With respect to the base polymer and the stabilizing agent, in preferred embodiments, the one or more non-polar polyolefin may comprise between about 30% to 99% (by weight) of the total amount of base polymer and stabilizing agent in the composition. More preferably, the one or more non-polar polyolefins comprise between about 50% and about 80%. Still more preferably, the one or more non-polar polyolefins comprise about 70%.

With respect to the filler, typically, an amount greater than about 0 to about 1000 parts per hundred of the polymer (polymer meaning here the non-polar polyolefin combined with the stabilizing agent) is used. In selected embodiments, between about 50 to 250 parts per hundred are used. In selected embodiments, between about 10 to 500 parts per hundred are used. In still other embodiments, from between about 20 to 400 parts per hundred are used.

These solid materials are preferably dispersed in a liquid medium, which in preferred embodiments is water. In preferred embodiments, sufficient base is added to neutralize the resultant dispersion to achieve a pH range of between about 6 to about 14. In preferred embodiments, sufficient base is added to maintain a pH of between about 9 to about 12. Water content of the dispersion is preferably controlled so that the solids content is between about 1% to about 74% (by volume). In another embodiment, the solid content is between about 25% to about 74% (by volume). In particularly preferred embodiments, the solids range is between about 30% to about 50% (without filler, by weight).

Dispersions formed in accordance with embodiments of the present invention are characterized in having an average particle size of between about 0.3 to about 3.0 microns. In other embodiments, dispersions have an average particle size of from about 0.8 µm to about 1.2 µm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes can be measured on a Beckman-Coulter LS230 laser-diffraction particle size analyzer or other suitable device.

For example, a formulation of the present invention can include surfactants, frothing agents, dispersants, thickeners, fire retardants, pigments, antistatic agents, reinforcing fibers, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent can be included in a composition of the present invention at a concentration of at least about 0.5 part per 100 parts of filler, by weight.

Furthermore, embodiments of the present invention may optionally include a thickener. Thickeners can be useful in the present invention to increase the viscosity of low viscosity dispersions. Thickeners suitable for use in the practice of the present invention can be any known in the art such as for instance poly-acrylate type or associate non ionic thickeners such as modified cellulose ethers. For example, suitable thickeners include ALCOGUM™ VEP-II (trade name of Alco Chemical Corporation), Rheovis™ and Viscalex™ (trade names of Ciba Ceigy), UCAR® Thickener 146, or Ethocell™ or Methocell™ (trade names of the Dow Chemical Company) and PARAGUM™ 241 (trade name of Para-Chem Southern, Inc.), or Bermacol™ (trademark of Akzo Nobel) or Aqualon™ (trademark Hercules) or ACUSOL® (trademark Rohm and Haas). Thickeners can be used in any amount necessary to prepare a compound of desired viscosity.

The ultimate viscosity of the dispersion is, therefore, controllable. Addition of the thickener to the dispersion including the amount of filler can be done with conventional means to result in viscosities as needed for the carpet coating. Viscosities of thus compounds can reach +3000 cP (brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (brookfield viscosity measured at room temperature with spindle rv3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

In a specific embodiment, a base polymer, a stabilizing agent, and a filler are melt-kneaded in an extruder along with water and a neutralizing agent, such as ammonia, potassium hydroxide, or a combination of the two to form a dispersion compound. Those having ordinary skill in the art will recognize that a number of other neutralizing agents may be used. In some embodiments, the filler may be added after blending the base polymer and stabilizing agent.

Any melt-kneading means known in the art may be used. In some embodiments, a kneader, a Banbury mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Patent Publication No. 20010011118.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Advantageously, by using an extruder in certain embodiments, the base polymer and the stabilizing agent may be blended in a single process to form a dispersion. Also, advantageously, by using one or more of the stabilizing agents listed above, the dispersion is stable with respect to the filler and other additives. Prior formulations involving polyolefin base polymers were unstable with respect to the filler.

Advantageously, polyolefin dispersions formed in accordance with the embodiments disclosed herein provide the ability to apply the dispersion to carpet samples and achieve good tuft lock, to adhere to primary and secondary backing, and to maintain a flexible laminate. In specific embodiments, the inventors have also discovered that compounds disclosed herein have good adhesion to polar substrates (such as the polyamides used for face fibers).

In a specific embodiment, a polyolefin dispersion is applied to a carpet using any application method known to those skilled in the art. For example, in one embodiment, in preparing polymer backed carpets according to the present invention, a polyolefin dispersion is applied as a layer of preferably uniform thickness onto the non-pile surface of a suitably prepared carpet substrate. Polyolefin precoats, laminate coats, and foam coats can be prepared by methods known to those of ordinary skill in the art of preparing such backings. Precoats, laminate coats and foam coats prepared from dispersions are described in P. L. Fitzgerald, "Integral Dispersion Foam Carpet Cushioning", J. Coat. Fab. 1977, Vol. 7 (pp. 107-120), and in R. P. Brentin, "Dispersion Coating Systems for Carpet Backing", J. Coat. Fab. 1982, Vol. 12 (pp. 82-91).

When preparing foams, it is often preferred to froth the dispersion. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed polyolefin backing, it is preferred to mix all components and then blend the air or gas into the mixture, using equipment such as an OAKES, MONDO or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers can include, for example, sulfates, succinamates, and sulfosuccinamates.

Figure 2:
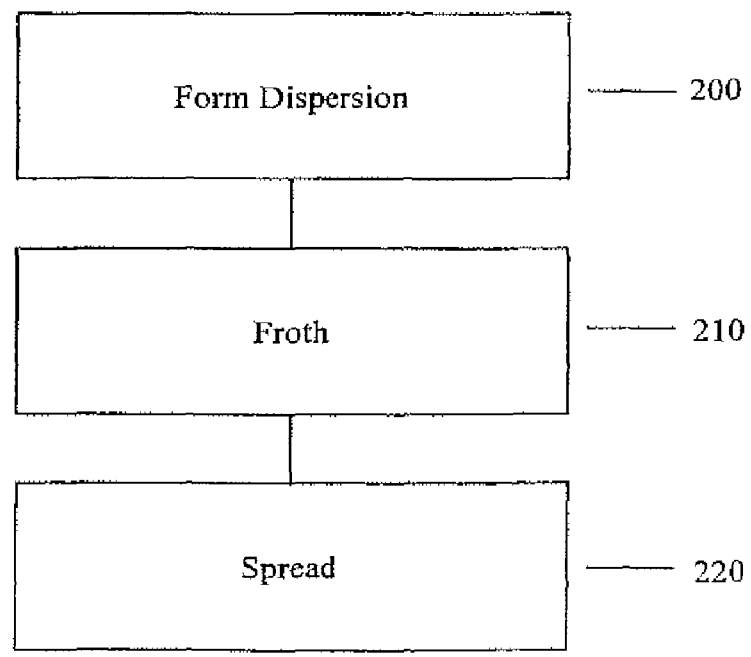
FIG. 2 shows a flowchart illustrating a method in accordance with an embodiment of the present invention.

In one embodiment of the present invention, shown in flowchart form in FIG. 2, a polyolefin dispersion is formed (ST 200). Next, the dispersion is frothed (ST 210), which may, for example, be done by mechanically mixing with air. The frothed dispersion is then spread onto a carpet (ST 220). In selected embodiments, the polyolefin dispersion is applied at about 65° C. to about 125° C. In preferred embodiments, the polyolefin dispersion is applied at about 85° C. to about 95° C.

The dispersion applied onto a substrate, e.g. a carpet, may be dried via any conventional drying method. Such conventional drying methods include but, are not limited to, air drying, convection oven drying, hot air drying, microwave oven drying, and/or infrared oven drying. The dispersion applied onto a substrate, e.g. a carpet, may be dried at any temperature; for example, it may be dried at a temperature in the range of equal or greater than the melting point temperature of the base polymer; or in the alternative, it may be dried at a temperature in the range of less than the melting point of the base polymer. The dispersion applied onto a substrate, e.g. a carpet, may be dried at a temperature in the range of about 60° F. (15.5° C.) to about 700° F. (371° C.). All individual values and subranges from about 60° F. (15.5° C.) to about 700° F. (371° C.) are included herein and disclosed herein; for example, the dispersion applied onto a substrate, e.g. a carpet, may be dried at a temperature in the range of about 60° F. (15.5° C.) to about 500° F. (260° C.), or in the alternative, the dispersion applied onto a substrate, e.g. a carpet, may be dried at a temperature in the range of about 60° F. (15.5° C.) to about 450° F. (232.2° C.). The temperature of the dispersion applied onto a substrate, e.g. a carpet, may be raised to a temperature in the range of equal or greater than the melting point temperature of the base polymer for a period of less than about 40 minutes. All individual values and subranges from less than about 40 minutes are included herein and disclosed herein; for example, the temperature of the dispersion applied onto a substrate, e.g. a carpet, may be raised to a temperature in the range of equal or greater than the melting point temperature of the base polymer for a period of less than about 20 minutes, or in the alternative, the temperature of the dispersion applied onto a substrate, e.g. a carpet, may be raised to a temperature in the range of equal or greater than the melting point temperature of the base polymer for a period of less than about 10 minutes, or in another alternative, the temperature of the dispersion applied onto a substrate, e.g. a carpet, may be raised to a temperature in the range of equal or greater than the melting point temperature of the base polymer for a period in the range of about 0.5 to 600 seconds. In another alternative, the temperature of the dispersion applied onto a substrate, e.g. a carpet, may be raised to a temperature in the range of less than the melting point temperature of the base polymer for a period of less than 40 minutes. All individual values and subranges from less than about 40 minutes are included herein and disclosed herein; for example, the temperature of the dispersion applied onto a substrate, e.g. a carpet, may be raised to a temperature in the range of less than the melting point temperature of the base polymer for a period of less than about 20 minutes, or in the alternative, the temperature of the dispersion applied onto a substrate, e.g. a carpet, may be raised to a temperature in the range of less than the melting point temperature of the base polymer for a period of less than about 10 minutes, or in another alternative, the temperature of the dispersion applied onto a substrate, e.g. a carpet, may be raised to a temperature in the range of less than the melting point temperature of the base polymer for a period in the range of about 0.5 to 600 seconds.

Drying the dispersion applied onto a substrate, e.g. a carpet, at a temperature in the range of equal or greater than the melting point temperature of the base polymer is important because it facilitates the formation of a film having a continuous base polymer phase with a discrete stabilizing agent phase dispersed therein the continuous base polymer phase thereby improving the oil and grease resistance as well as providing a barrier for moisture and vapor transmission.

EXAMPLES

A precoat was applied to a sample of tufted carpet, using a polyolefin dispersion, referred to as TCR 002. The polyolefin dispersion comprised a base polymer/stabilizing agent mix formed from AFFINITY™ 8200/PRIMACOR™ 5980i in a 70% to 30% blend (by weight), both of which are available from The Dow Chemical Company (Midland, Mich.). The tufted carpet had polypropylene pile and polypropylene backing. The thermoplastic polymer, AFFINITY™ 8200, as delivered consisted of soft, flexible beads. PRIMACOR™ 5980i, as delivered consisted of hard, spherical beads.

A 25 wt. % KOH stock solution was prepared to neutralize the surfactant. The final density of this solution was 1.25 g/ml at 20° C. This preparation is shown in Table 1 below:

TABLE 1

| Preparation of a 25 wt. % KOH stock solution. | | |
|---|---|---|
| Material | Wt. (g) | Wt. Fraction |
| 45 wt. % KOH | 555.0 | 0.555 |
| Deionized water | 445.0 | 0.445 |
| | 1000.0 | 1.000 |

The polymer, AFFINITY™ 8200 was to be fed through a primary solids feeder. This feeder consisted of a Schenck loss-in-weight feeder while the PRIMACOR™ 5980i was to be fed through secondary solids feeder. This secondary feeder, Schenck Model 301/304, was set to deliver PRIMACOR™ 5980i at the desired ratio. During this setup, the AFFINITY™ 8200/PRIMACOR™ 5980i ratio was to be varied from 70/30 to 85/15 (by weight). Alltech 301 macrohead HPLC pumps metered all aqueous streams. The water or water/KOH mixture was pumped into the twin-screw extruder though a tappet style injector design.

This aqueous stream was pre-heated through a 24" core/shell heat exchanger (20' ⅛ tubing core) tempered by a DC200 Silicone oil bath set at 190° C. Additionally, the backpressure regulator previously installed, located immediately upstream from the injector, and was set to a value of 550 psi. The dilution stream was also pre-heated with an identical exchanger/bath setup heated to 150° C. Secondary dilution was also used for this experiment. A temperature/pressure probe located in Zone 7 (e-zone) was used to determine the effect of pressure on final particle size. The melt pump controlling the extruder backpressure consisted of a Zenith series pump with a 2.92 cc/rev capacity.

During the experiment, the IA/Feed Ratio was varied from 0.467-0.098. The PRIMACOR™ 5980i concentration was varied from 30-15 wt % of the total polymer. The base addition was also varied from 9.6-4.5 ml/min of the 25 wt. % KOH stock solution (3.000-1.406 g KOH/min). The molar neutralization varied from 198.9-90.1. Several samples were obtained during these water/base/PRIMACOR™ 5980i variations. These samples were measured on a Coulter LS230 light-scattering particle analyzer, implementing the epoxy model, after suitable dilution in a prepared 0.025 wt. % KOH solution.

Particle Size

The smallest particle size achieved at 30 wt % PRIMACOR™ 5980i was 0.67 μm with a polydispersity of 2.20 at an IA/Polymer ratio of 0.321 and a screw speed of 450 rpm. At 15 wt % PRIMACOR™ 5980i, the smallest particle size achieved was 4.18 μm with a polydispersity of 13.30 at an IA/Polymer ratio of 0.240 and a screw speed of 450 rpm.

Neutralization Level

The PRIMACOR™ 5980i at 30 wt % was partially neutralized with caustic at a level of 90.1 molar %. The calculated 100% neutralization level was to be 3.016 g/min of KOH compared to the metered quantity of 2.719. At 15 wt %, the PRIMACOR™ 5980i was partially neutralized with caustic at a level of 93.2 molar %. The calculated 100% neutralization level was to be 1.508 g/min of KOH compared to the metered quantity of 1.406.

Sampling

Five-gallon samples were obtained with the following specification (after post-dilution and preservative addition).

| Constituent | Concentration (wt %) |
|---|---|
| AFFINITY ™ 8200 | 32.1 |
| PRIMACOR ™ 5980i | 13.8 |
| Water | 54.1 |
| DOWICIL ® 200 | 0.02 |
| Sample Specifications | |
| Avg. Particle Size (μm) | 0.75 |
| Polydispersity (Dv/Dn) | 2.26 |
| Solid Content (wt. %) | 45.9 |
| pH | 10.7 |
| Viscosity (cp) | 1860* |

*RV3 spindle, 22.1° C., 50 rpm

Three versions of this dispersion were made: First, an unfilled (i.e., no filler added) version was deposited onto a carpet sample. Second, a sample was made using 200 parts per hundred (with respect to the base polymer and stabilizing agent) of calcium carbonate filler, and a third sample was made using 200 parts per hundred (with respect to the base polymer and stabilizing agent) aluminum trihydrate. 0.25 parts per hundred of Alcopol® 0 wetting agent, available from Ciba Specialty Chemicals (Basel, Switzerland), was added to the second and third samples. A number of comparison samples were also generated and testing was performed.

| DESCRIPTION OF TESTING/SPECIFICS ON EACH OF THE BELOW SAMPLES | | |
|---|---|---|
| Sample # | Description of Polymer Dispersion | Filler |
| 1 | Conventional Ethylene vinyl acetate dispersion | None |
| 2 | PRIMACOR ™ 3460 DMD dispersion at +45% solids KOH neutralized | None |
| 3 | SBS block copolymer | None |
| 4 | ENGAGE ™ 8130 | None |
| 5 | Techseal (which is a PRIMACOR ™ 5980 dispersion, KOH neutralized 40% solids) | None |
| 6 | Nitrile latex | None |
| 7 | PRIMACOR ™ 3460/DL 552 latex | None |
| 8 | SBS/DL 552 | None |
| 9 | ENGAGE ™ 8130/DL 552 latex | None |
| 10 | Techseal/DL 552 | None |
| 11 | Nitrile latex/DL 552 | None |
| 13 | TCR 002 | 200 parts per hundred aluminum trihydrate |
| 14 | TCR 002 | None |
| 15 | TCR 002 | 200 parts per hundred calcium carbonate |

Figure 3:
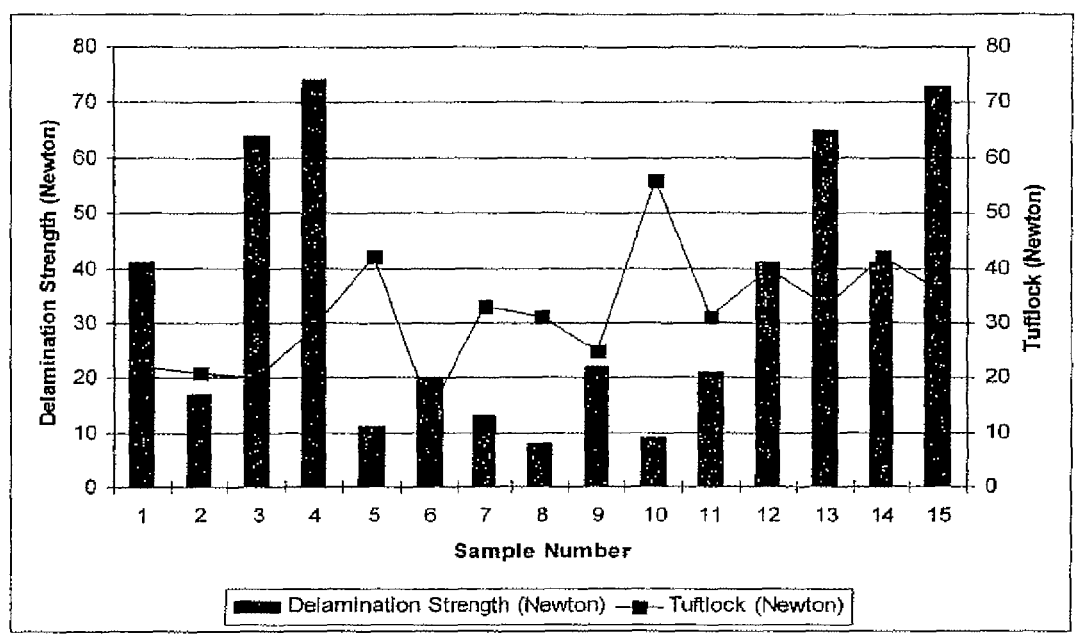
FIG. 3 shows a comparison of embodiments of the present invention with prior art compositions.

Results of the test are displayed in FIG. 3. As shown in that figure, embodiments formulated in accordance with the present invention (13 and 15 in the table above) showed good adhesion and tuftlock.

Advantageously, one or more embodiments of the present invention provide compositions, methods, and articles having good performance in their intended applications. In one application, for example, one or more embodiments of the present invention may be used on carpets in the automotive industry.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431 (M_{polystyrene})$.

Polyethylene equivalent molecular weight calculations are performed using Viscotek TriSEC software Version 3.0.

Density

Samples for density measurement are prepared according to ASTM D 1928. Measurements are made within one hour of sample pressing using ASTM D792, Method B.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d_2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI=\Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\sum(w_i(BI_i - ABI)^2)}{\frac{(N-1)\sum w_i}{N}}}$$

where N is defined as the number of fractions with $BI_i$ greater than zero. Referring to FIG. 9, for each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$\operatorname{Ln} P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments as illustrated in FIG. 8, random ethylene copolymers and/or preparative TREF fractions of random copolymers satisfy the following relationship:

$$\operatorname{Ln} P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $\operatorname{Ln} PX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $\operatorname{Ln} P_{XO} = \alpha/T_X + \beta$ using a measured value of $T_X$.

Once the block index (BI) for each preparative TREF fraction is obtained, the weight average block index, ABI, for the whole polymer can be calculated.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An article comprising:
   a substrate; and
   a film associated at least with one surface of the substrate;
     wherein said film is derived from an aqueous frothed dispersion comprising;
     at least one base polymer selected from the group consisting of an ethylene based thermoplastic polymer, a propylene based thermoplastic polymer, and combinations thereof wherein said film comprises;
     at least one polymeric stabilizing agent;
     at least one filler;
     at least one frothing agent; and
     water;
   wherein said film comprises a continuous base polymer phase, and a discrete stabilizing agent phase dispersed in said continuous polymer phase.

2. The article according to claim 1, wherein the aqueous frothed dispersion comprises 35 to 55 percent by weight of the at least one base polymer.

3. The article according to claim 1, wherein the stabilizing agent comprises at least one neutralized polar polymer.

4. The article according to claim 3, wherein the polar polymer comprises at least one selected from a polyolefin having a polar group as co-monomer and a polyolefin having a polar group as grafted monomer.

5. The article according to claim 1, wherein a combined amount of the at least one base polymer and the polymeric stabilizing agent comprises about 1 to about 74 volume percent of the aqueous frothed dispersion.

6. The article according to claim 1, wherein the aqueous frothed dispersion has a pH from about 6 to about 14.

7. The article according to claim 1, wherein the aqueous frothed dispersion has an average particle size from about 0.3 to about 3.0 microns.

8. The article according to claim 1, wherein the aqueous frothed dispersion further comprises at least one selected from a wetting agent, surfactants, anti-static agents, a neutralizing agent, a thickener, a rheology modifier, a biocide, and a fungicide.

9. A method for forming an article comprising the steps of:
   selecting an aqueous frothed dispersion comprising;
     at least one base polymer selected from the group consisting of an ethylene based thermoplastic polymer, a propylene based thermoplastic polymer, and combinations thereof;

at least one polymeric stabilizing agent;
at least one filler;
at least one frothing agent; and
water;
selecting a substrate;
applying said aqueous frothed dispersion to at least one surface of said substrate;
removing at least a portion of the water;
thereby forming a film associated with said substrate;
wherein said film comprises a continuous base polymer phase, and a discrete stabilizing agent phase dispersed in said continuous polymer phase.

10. The method for forming an article according to claim 9, wherein removing at least a portion of the water is accomplished by exposing the coated substrate to an elevated temperature.

11. The method for forming an article according to claim 10, wherein the elevated temperature is in the range of from 65 to 125° C.

* * * * *